Sept. 15, 1959    E. DURHAM    2,904,016
HIGH TEMPERATURE AND PRESSURE LIQUID HEATER
Filed Nov. 15, 1955    2 Sheets-Sheet 1
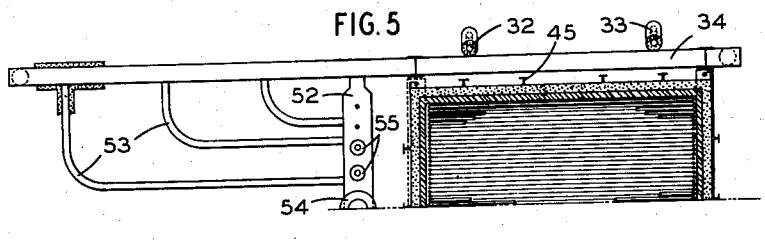
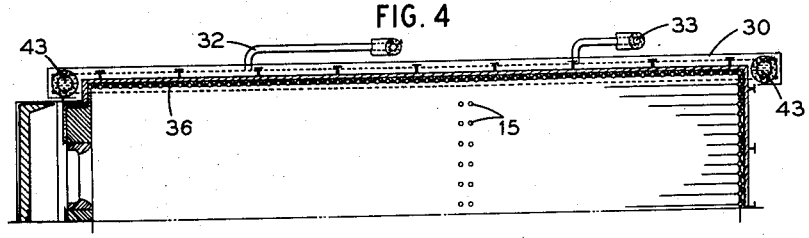
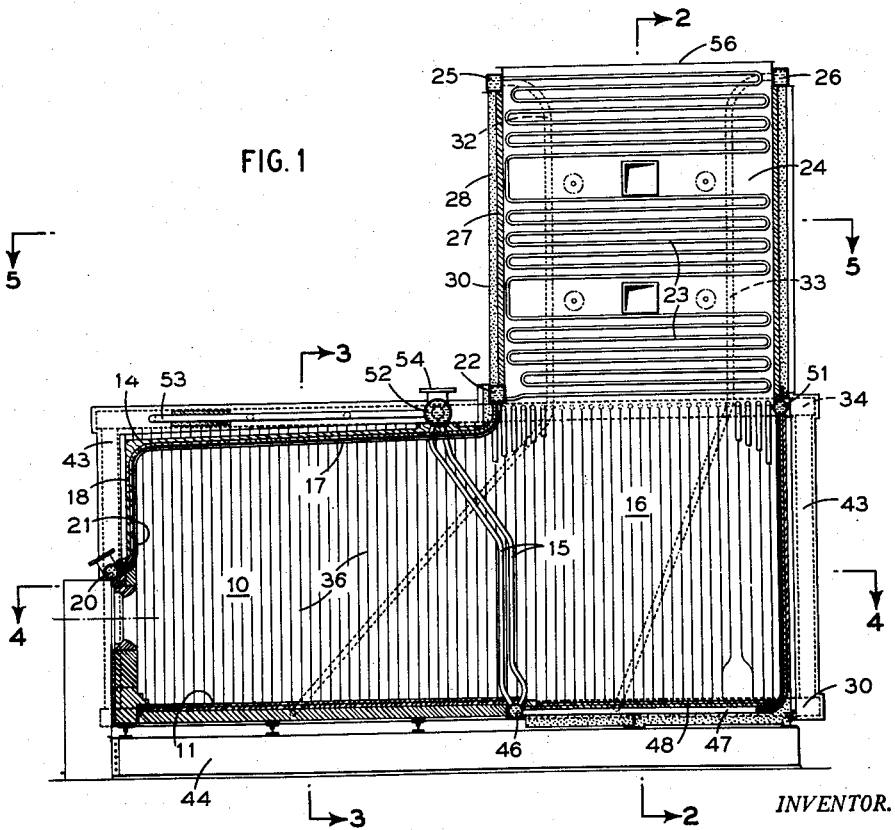
INVENTOR.
Edwin Durham
BY
*J. P. Moran*
ATTORNEY Sept. 15, 1959 E. DURHAM 2,904,016
HIGH TEMPERATURE AND PRESSURE LIQUID HEATER
Filed Nov. 15, 1955 2 Sheets-Sheet 2

INVENTOR.
Edwin Durham
BY
*J. F. Moran*
ATTORNEY

United States Patent Office 2,904,016
Patented Sept. 15, 1959

2,904,016

HIGH TEMPERATURE AND PRESSURE LIQUID HEATER

Edwin Durham, Westfield, N.J., assignor to The Babcock & Wilcox Company, New York, N.Y., a corporation of New Jersey Application November 15, 1955, Serial No. 546,949

2 Claims. (Cl. 122—336)

The present invention relates to a high temperature liquid heater, and more particularly to apparatus for heating high temperature, high pressure water.

High temperature hot water is particularly useful for space heating purposes, and is also useful for process purposes, where temperatures of the order of 300 or 400° F. are desirable. The means for heating the water usually involves the combustion of a fuel where the hot products of combustion are passed over heat exchange surfaces confining the water. Various designs of hot water boilers have been used, but it is highly advantageous to use the simplest type of construction for heat exchange purposes, consistent with high efficiency and reliable operation.

In accordance with the present invention, I provide a liquid heater which is characterized by a preliminary heating section which is exposed to both high temperature and relatively low temperature heating gases and arranged for the forced circulation of liquid therethrough, with the partially heated liquid discharged under pressure to heat exchange surfaces in a high temperature heating zone where a combination of natural and forced liquid circulation is used.

The various features of novelty which characterize my invention are pointed out with particularity in the claims annexed to and forming part of this specification. For a better understanding of the invention, its operating advantages and specific objects attained by its use, reference should be had to the accompanying drawings and descriptive matter in which I have illustrated and described a preferred embodiment of the invention.

Of the drawings:

Fig. 1 is an elevation, in section, of a liquid heater constructed in accordance with the present invention;

Figure 7:
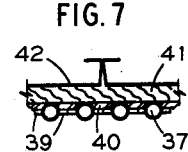
Figure 2:
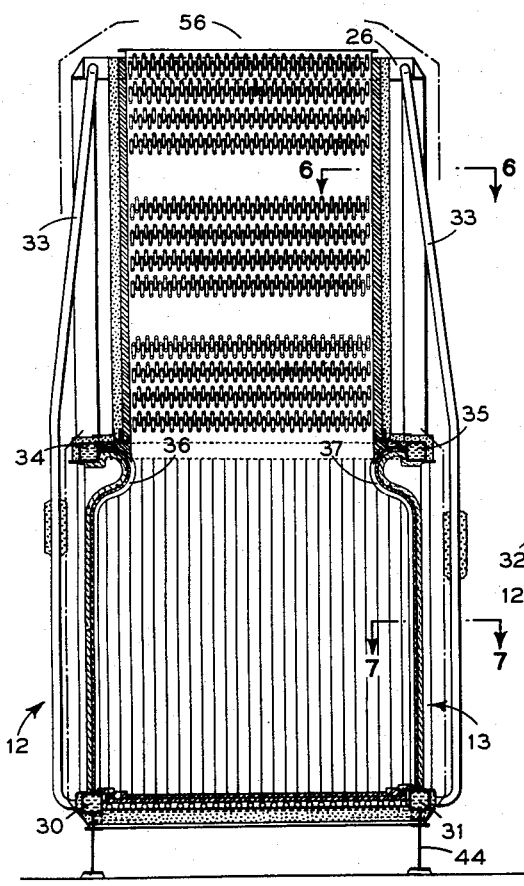
Fig. 2 is a section, taken on the line 2—2 of Fig. 1.
Figure 6:
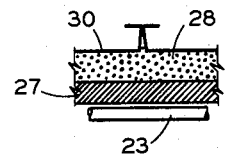
Figure 3:
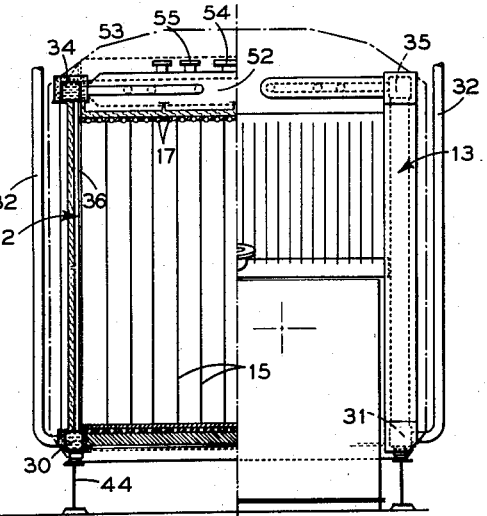
Fig. 3 is a partial front view of the liquid heater, and a partial section, taken on the line 3—3 of Fig. 1.

Figs. 4 and 5 are plan sections taken on the lines 4—4 and 5—5, respectively, of Fig. 1; and Figs. 6 and 7 are enlarged sections taken on the lines 6—6 and 7—7, respectively, of Fig. 2.

In general, as shown in the drawings, the present invention is illustrated in the form of a hot water boiler wherein a primary and secondary furnace is enclosed by walls some of which are provided with water cooled tubes, and a convection heating section which is provided with a plurality of transversely extending sinuous tubes. The primary furnace is supplied with fuel, such as oil or gas, introduced through one or more burners positioned in a wall of the furnace. The furnace may alternately be supplied with solid fuel, such as may be delivered thereto by a stoker.

The furnace is of generally rectangular horizontal and vertical section with a primary furnace 10 having a refractory floor 11 and water cooled side walls 12 and 13 and roof 14. The rear end portion of the primary furnace is provided with widely spaced tubes 15 arranged in a pair of rows extending upwardly across the furnace with the heating gases produced in the primary furnace 10 discharging between the tubes 15 into the secondary furnace 16. As shown in Fig. 1, the roof tubes of the primary furnace 10 are formed by a row of tubes 17 having a downward extension 21 adjacent the front wall 18 thereof with the downward extension terminating generally mid-way the height of the primary furnace. The tubes 17 open at one end into a horizontally disposed inlet header 20 which is positioned on the exterior side of the front wall 18 and is supplied with high pressure water as delivered thereto from the heating system circulating pump (not shown). The water may be delivered to the heater 20 by a boiler circulating pump, if desired, although such a separate pump is usually unnecessary.

At the opposite end of the roof 14, the tubes 17 are bent into a substantially vertical plane and open into a horizontally disposed transverse distributing header 22. The header 22 receives the partially heated high pressure water passed through the roof tubes 17, and discharges the water into a row of heating tubes 23 with each tube bent to form a sinuous arrangement extending upwardly through a convection heating gas-pass 24 which is mounted upon and opens to the upper portion of the secondary furnace 16. At the upper end of the convection gas pass 24, alternate tubes 23 of the row open into a horizontally disposed transverse header 25 positioned on the forward side of the convection gas pass 24 while the other tubes 23 open into a companion header 26 positioned on the opposite side of the convection gas pass 24. The confining walls of the convection gas-pass 24 are formed of refractory material 27 with an exterior coating of insulating brick enclosed by a metallic casing, as shown particularly in Fig. 6.

The high pressure water delivered to the headers 25 and 26 at the upper end of the convection gas-pass 24 are connected by external downcomers to longitudinal headers 30 and 31 which are positioned adjacent the foundation of the furnace and on opposite sides of the furnace setting. The downcomer arrangement is illustrated in Figs. 1 to 5, inclusive. The header 25 is provided with a downcomer 32 at each of the opposite ends thereof with the lower end portion of the downcomers 32 inclined forwardly and opening to the longitudinal headers 30 and 31 at a position substantially mid-way between the front wall 18 of the furnace 10 and the tubes 15. The downcomers 33, each opening to an opposite end of the header 26, are inclined forwardly in their lower end portions to open to the longitudinal headers 30 and 31 on opposite sides of the secondary furnace 16 and at a position intermediate the length of the secondary furnace 16.

The lower longitudinal headers 30 and 31 are each positioned on the exterior side of the furnaces 10 and 16 and are each connected with an upper longitudinal header 34 and 35, respectively, of corresponding length by a plurality of substantially upright wall tubes 36 and 37, respectively, which line the side walls of the primary and secondary furnaces 10 and 16, respectively.

The side wall tubes 36 and 37 are of relatively small diameter, as for example 2 inches, and in the primary furnace 10 are substantially straight throughout their extent. Within the secondary furnace 16 the upper end portions of the tubes 36 and 37 are bent inwardly of the furnace to form a throat portion 38 corresponding with the entrance end of the convection gas-pass 24. The upper ends of the wall tubes 36 and 37 are bent to open into the headers 34 and 35, respectively, from the furnace side of the headers. A typical section of the furnace side wall construction is illustrated in Fig. 7 where the tubes are shown as being provided with flat studs 39 welded to opposite sides of the tubes, in a plane parallel to the plane of the wall. An initially plastic refractory material 40 is positioned behind the studs and between the tubes, with a layer of insulating material 41 and a metallic casing 42 completing the wall structure.

In the arrangement shown, the upper and lower longitudinal headers 30 and 34, and 31 and 35 are each connected at opposite ends with externally positioned substantially upright corner tubes 43 which not only interconnect the headers for circulation purposes, but also provide a structural support for the primary and secondary furnaces 10 and 16. As shown in the drawings, the primary and secondary furnaces are bottom supported on longitudinally extending I-beams 44, although a concrete slab support would also be effective as a foundation. The convection gas-pass 24 is mounted directly upon the secondary furnace 16, with the gas-pass 24, walls, and headers 25 and 26 supported by structural steel work such as indicated at 45, with the weight of the gas-pass assembly resting upon the furnace 16 and its supports.

As shown particularly in Fig. 1 the screen tubes 15 open at their lower ends to a transverse header 46 which is connected at its opposite ends with the lower longitudinal headers 30 and 31. The header 46 is also provided with a row of tubes 47 which are extended rearwardly in a generally horizontal direction to form a part of the floor 48 of the secondary furnace 16, with the tubes 47 thereafter bent in an upward direction to form a part of the rear wall 50 of the secondary furnace. The upper ends of the tubes 47 open to an upper transverse header 51 which is extended between and opens into the upper headers 34 and 35.

A horizontally disposed collecting manifold 52 interconnects the upper longitudinal headers 34 and 35 and is positioned above the refractory material formed on the exterior side of the primary furnace roof 14. The manifold 52 is also connected with the longitudinal headers 34 and 35 by a plurality of conduits 53 for the discharge of hot water to the manifold. The manifold is provided with an outlet connection 54 for the high pressure water heated in the boiler and is also provided with the necessary vent connection and relief valves, as indicated at 55.

In the operation of the apparatus described, fuel is burned in the primary furnace 10 with the gas of combustion passing through the secondary furnace 16 and the convection gas pass 24. With combustion occurring within the primary furnace 10, the side wall and roof tubes will be exposed to the high temperature heating effects of the fuel combustion. Thus a relatively high rate of heat exchange will occur between the combustion gases and the water in the furnace 10 wall and roof tubes. A somewhat lower heating effect will occur in the secondary combustion chamber 16 and in the convection gas-pass 24 due to the progressive cooling of the combustion gas by heat exchange with the water cooled surfaces within the furnaces 10 and 16.

With feed water delivered to the header 20 under a positive pressure, the flow of water through the roof tubes 17 and the convection tubes 23 will be under forced flow conditions. The partially heated water delivered to the headers 25 and 26 will be substantially equally divided and with the downcomer arrangement disclosed substantially equal quantities of water will be discharged to the longitudinal headers 30 and 31. In passing from the lower headers 30 and 31 through the wall tubes 36 and 37 to the upper headers 34 and 35 and thence to the outlet 54 the water movement through the circuits will be generally of the forced flow type. However, within the tube circuits some natural circulation can occur, in addition to the possible downflow of water through the corner tubes 43. For example, it will be observed that the heating effect within the primary furnace 10 will be greater than within the secondary furnace 16 due to the differences in gas heating temperatures in the connected furnaces. Thus, under some conditions of operation, some of the wall tubes 36 and 37 within the wall area of the secondary furnace 16 may become downcomers.

While in accordance with the provision of the statutes, I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A high temperature liquid heater comprising walls defining an elongated furnace, other walls defining a convection gas-pass opening upwardly from an end portion of said furnace for the movement of heating gases therethrough, burner means positioned in the end of said furnace remote from said gas-pass opening, the roof of said furnace being provided with tubular elements arranged for parallel forced flow of liquid therethrough, a horizontally disposed liquid distributing header positioned upwardly adjacent the roof of said furnace and adjacent one wall of said convection gas-pass to receive the liquid discharging from said tubular elements, a collecting header positioned in each of two opposite walls and adjacent the upper end portion of said convection gas-pass, two groups of sinuous tubes disposed in said convection gas-pass with one alternate group of sinuous tubes connecting said distributing header and one of said collecting headers and the other alternate group of sinuous tubes connecting said distributing header and the other of said collecting headers, upper and lower side wall headers disposed longitudinally of the walls of said elongated furnace, rows of upright tubular elements positioned in the side walls of said furnace and connecting said upper and lower headers, unheated downcomers connecting the said one of said collecting headers with the lower of said longitudinal headers adjacent said burner means and other unheated downcomers connecting said other of said collecting headers with the lower of said longitudinal headers at a position remote from said burner means, a hot liquid collecting manifold transversely connecting said upper side wall headers, and a plurality of tubes connecting said upper furnace side wall headers with said hot liquid collecting manifold to receive the circulation of liquid through said furnace side wall tubular elements to said upper headers.

2. A high temperature liquid heater comprising walls defining an elongated furnace, other walls defining a convection gas-pass opening upwardly from an end portion of said furnace for the movement of heating gases therethrough, burner means positioned in the end of said furnace remote from said gas-pass opening, the roof of said furnace being provided with tubular elements arranged for parallel forced flow of liquid therethrough, a horizontally disposed liquid distributing header positioned upwardly adjacent the roof of said furnace and adjacent one wall of said convection gas-pass to receive the liquid discharging from said tubular elements, a collecting header positioned in each of two opposite walls and adjacent the upper end portion of said convection gas-pass, two groups of sinuous tubes disposed in said convection gas-pass with one alternate group of sinuous tubes connecting said distributing header and one of said collecting headers and the other alternate group of sinuous tubes connecting said distributing header and the other of said collecting headers, upper and lower headers disposed longitudinally of the side walls of said furnace, rows of upright tubular elements positioned in the side walls of said furnace and connecting said upper and lower headers, a transverse header connecting the lowermost of said longitudinally extended headers at a position intermediate the length of said furnace, and screen tubes projecting in an upward direction across said furnace from said transverse header to said hot liquid collecting manifold, unheated downcomers connecting the said one of said collecting headers with the lower of said longitudinal headers adjacent between said burner means and said screen tubes, and other unheated downcomers connecting said other of said collecting headers with the lower of said longitudinal headers rearwardly of said screen tubes, a hot liquid collecting manifold transversely connecting said upper side wall headers, and a plurality of tubes connecting said upper furnace side wall headers with said hot liquid collecting manifold to receive the circulation of liquid through said furnace side wall tubular elements to said upper headers.

References Cited in the file of this patent
UNITED STATES PATENTS

| | | |
|---|---|---|
| 1,468,666 | Lacey | Sept. 25, 1923 |
| 1,883,124 | Thede et al. | Oct. 18, 1932 |
| 1,885,071 | Banck | Oct. 25, 1932 |
| 1,973,377 | Gordon | Sept. 11, 1934 |